United States Patent
Yoshida et al.

(10) Patent No.: US 8,777,759 B2
(45) Date of Patent: Jul. 15, 2014

(54) UNIVERSAL JOINT AND PROPELLER SHAFT

(75) Inventors: Keigo Yoshida, Atsugi (JP); Hideaki Aoki, Hiratsuka (JP); Hiromichi Komai, Hadano (JP); Shinichi Kondo, Hiratsuka (JP); Yoshimichi Takano, Atsugi (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 13/552,088

(22) Filed: Jul. 18, 2012

(65) Prior Publication Data

US 2013/0053154 A1 Feb. 28, 2013

(30) Foreign Application Priority Data

Aug. 30, 2011 (JP) ................................ 2011-186718

(51) Int. Cl.
*F16D 3/41* (2006.01)
(52) U.S. Cl.
USPC ............................................ 464/14; 464/128
(58) Field of Classification Search
USPC ............. 464/11, 14, 112, 119, 128, 130–132, 464/136, 904
See application file for complete search history.

(56) References Cited

U.S. PATENT DOCUMENTS

| | | | | |
|---|---|---|---|---|
| 3,635,535 A | * | 1/1972 | Schultenkamper | 464/132 X |
| 4,310,206 A | * | 1/1982 | Weible | 464/11 X |
| 4,419,086 A | * | 12/1983 | Condon | 464/14 |
| 4,515,574 A | * | 5/1985 | Mazziotti | 464/131 |
| 4,530,675 A | * | 7/1985 | Mazziotti | 464/131 |
| 6,579,186 B2 | * | 6/2003 | Fischer et al. | 464/14 |
| 7,357,720 B2 | * | 4/2008 | Sekine | 464/14 |
| 2008/0283338 A1 | * | 11/2008 | Mizuno et al. | |

FOREIGN PATENT DOCUMENTS

| | | | |
|---|---|---|---|
| JP | 55024243 A | * | 2/1980 |
| JP | 2009-047181 A | | 3/2009 |
| JP | 2009047181 A | * | 3/2009 |

OTHER PUBLICATIONS

Universal Joint and Driveshaft Design Manual. Warrendale, PA: Society of Automotive Engineers, 1979. p. 39. TJ1059.S62.*

* cited by examiner

*Primary Examiner* — Gregory Binda
*Assistant Examiner* — Josh Skroupa
(74) *Attorney, Agent, or Firm* — Foley & Lardner LLP

(57) ABSTRACT

In a universal joint, a cross shaft member includes four shaft parts forming a cross-shape. Each of four bearing cups corresponding respectively to the shaft parts has a hollow-cylindrical shape having a bottom and is rotatably mounted to the corresponding shaft part through a roller disposed between an inner peripheral surface of the each bearing cup and an outer peripheral surface of the corresponding shaft part. Each bearing cup includes an inner bottom surface in sliding contact with a distal end surface of the corresponding shaft part, wherein the sliding contact is in an annular region encompassing a central axis of the corresponding shaft part. The distal end surface of each shaft part is formed with an annular groove encompassing the central axis of the first shaft part for storing oil.

15 Claims, 4 Drawing Sheets

UNIVERSAL JOINT AND PROPELLER SHAFT

BACKGROUND OF THE INVENTION

The present invention relates generally to a propeller shaft for a motor vehicle, and a universal joint adapted to such a propeller shaft.

A typical propeller shaft of a motor vehicle is composed of two or three separate shafts which include a drive shaft linked to a transmission side, and a driven shaft linked to a differential gear side. This propeller shaft is provided with a Cardan type universal joint to join one longitudinal end of one of the separate shafts with one longitudinal end of another.

Japanese Patent Application Publication No. 2009-047181 discloses such a universal joint. The universal joint includes: a cross shaft member including four shaft parts forming a cross-shape; and four bearing cups each of which has a hollow-cylindrical shape having a bottom and is rotatably mounted to a corresponding one of the shaft parts through a needle bearing disposed between an inner peripheral surface of the each bearing cup and an outer peripheral surface of the corresponding shaft part.

Each shaft part of the cross shaft member includes an oil hole inside, which extends in the longitudinal direction of the shaft part and allows lubricating oil such as grease to flow in the longitudinal direction of the shaft part. The inner bottom surface of each bearing cup includes a central circular recess which faces and communicates with the oil hole, and further includes oil grooves each of which extends radially outwardly from the circular recess and communicates with the circular recess.

In the configuration described above, lubricating oil flows through the oil hole of the shaft portion of the cross shaft member to the inner bottom surface of the bearing cup along with rotation of the propeller shaft, and then flows from the circular recess through the radial oil grooves to the needle bearing side, and thereby holds lubricated the boundary between the distal end surface of the shaft part and the inner bottom surface of the bearing cup.

SUMMARY OF THE INVENTION

In the configuration described above, the boundary between the distal end surface of the shaft part and the inner bottom surface of the bearing cup needs to be supplied with a sufficient quantity of lubricating oil, because hard sliding movement generally occurs at this place when the propeller shaft is rotating fast.

Japanese Patent Application Publication No. 2009-047181 addresses this demand by the provision of the circular recess and the radial oil grooves. However, this structure may be confronted with a problem that after having flown from the oil hole to the circular recess, the lubricating oil flows quickly to the needle bearing side. This may tend to cause a shortage of lubricating oil at the boundary between the distal end surface of the shaft part and the inner bottom surface of the bearing cup, and thereby cause a lubricating film at this place to be removed, and finally cause seizing at the boundary.

In view of the foregoing, it is preferable to provide a propeller shaft or universal joint which is capable of constantly holding lubricating oil between a distal end surface of a shaft part of a cross shaft member and an inner bottom surface of a corresponding bearing cup, and thereby preventing a lubricating film therebetween from being removed.

According to one aspect of the present invention, a universal joint comprises: a cross shaft member including first, second, third and fourth shaft parts forming a cross-shape; and first, second, third and fourth bearing cups corresponding respectively to the first, second, third and fourth shaft parts, wherein each bearing cup has a hollow-cylindrical shape having a bottom and is rotatably mounted to the corresponding shaft part through a roller disposed between an inner peripheral surface of the each bearing cup and an outer peripheral surface of the corresponding shaft part, wherein each bearing cup includes an inner bottom surface in sliding contact with a distal end surface of the corresponding shaft part, wherein the sliding contact is in an annular region encompassing a central axis of the corresponding shaft part; wherein at least one of the distal end surface of the first shaft part and the inner bottom surface of the first bearing cup is formed with at least one annular groove encompassing the central axis of the first shaft part for storing oil. The universal joint may be configured so that the distal end surface of the first shaft part is formed with the annular groove. The universal joint may be configured so that the distal end surface of each of the second, third and fourth shaft parts is formed with at least one annular groove encompassing the central axis of the each of the second, third and fourth shaft parts for storing oil. The universal joint may be configured so that the annular groove has a V-shape cross-section. The universal joint may be configured so that at least one of the distal end surface of the first shaft part and the inner bottom surface of the first bearing cup is formed with a communication passage allowing fluid communication between the annular groove and an oil hole formed inside of the first shaft part. The universal joint may be configured so that the communication passage extends from the oil hole radially of the first shaft part. The universal joint may be configured so that: each shaft part is formed with an oil hole inside thereof, wherein the oil hole has an opening at the distal end surface of the each shaft part; and each bearing cup has a recess at the inner bottom surface, wherein the recess faces the oil hole of the corresponding shaft part and defines a space for holding oil. The universal joint may be configured so that the space has a larger size radially of the corresponding shaft part than the oil hole.

According to another aspect of the present invention, a universal joint comprises: a cross shaft member including first, second, third and fourth shaft parts forming a cross-shape; and first, second, third and fourth bearing cups corresponding respectively to the first, second, third and fourth shaft parts, wherein each bearing cup has a hollow-cylindrical shape having a bottom and is rotatably mounted to the corresponding shaft part through a roller disposed between an inner peripheral surface of the each bearing cup and an outer peripheral surface of the corresponding shaft part, wherein each bearing cup includes an inner bottom surface in sliding contact with a distal end surface of the corresponding shaft part, wherein the sliding contact is through lubricating oil; wherein at least one of the distal end surface of the first shaft part and the inner bottom surface of the first bearing cup is formed with at least one annular groove encompassing the central axis of the first shaft part for holding the lubricating oil. The universal joint may be configured so that the distal end surface of each shaft part is formed with the annular groove. The universal joint may be configured so that the distal end surface of the each shaft part is formed with a communication passage allowing fluid communication between the annular groove of the each shaft part and an oil hole formed inside of the each shaft part. The universal joint may be configured so that the communication passage extends from the oil hole radially of the each shaft part. The universal joint may be configured so that: each shaft part is formed with an oil hole inside thereof, wherein the oil hole has an opening at the distal end surface of the each shaft part and is filled with the lubricating oil; and each bearing cup has a recess at the inner bottom surface, wherein the recess faces the oil hole of the corresponding shaft part and defines a space for holding the lubricating oil. The universal joint may be configured so that the space allows the lubricating oil to flow from the oil hole to the annular groove. The universal joint may be configured so that the lubricating oil stored in the annular groove forms an oil film between the distal end surface of the each shaft part and the inner bottom surface of the corresponding bearing cup.

According to a further aspect of the present invention, a propeller shaft comprises: a ball yoke fixed to a longitudinal end portion of a hollow shaft body, the ball yoke constituting a universal joint; a cross shaft member including first, second, third and fourth shaft parts forming a cross-shape, wherein the first shaft part is arranged in a race hole formed in the ball yoke; and first, second, third and fourth bearing cups corresponding respectively to the first, second, third and fourth shaft parts, wherein each bearing cup has a hollow-cylindrical shape having a bottom and is rotatably mounted to the corresponding shaft part through a roller disposed between an inner peripheral surface of the each bearing cup and an outer peripheral surface of the corresponding shaft part, wherein each bearing cup includes an inner bottom surface in sliding contact with a distal end surface of the corresponding shaft part, wherein the sliding contact is in an annular region encompassing a central axis of the corresponding shaft part; wherein at least one of the distal end surface of the first shaft part and the inner bottom surface of the first bearing cup is formed with at least one annular groove encompassing the central axis of the first shaft part for storing oil. The propeller shaft may be configured so that the distal end surface of the first shaft part is formed with the annular groove. The propeller shaft may be configured so that the distal end surface of each of the second, third and fourth shaft parts is formed with at least one annular groove encompassing the central axis of the each of the second, third and fourth shaft parts for storing oil. The propeller shaft may be configured so that at least one of the distal end surface of the first shaft part and the inner bottom surface of the first bearing cup is formed with a communication passage allowing fluid communication between the annular groove and an oil hole formed inside of the first shaft part. The propeller shaft may be configured so that the distal end surface of the first shaft part is formed with the annular groove and the communication passage.

DETAILED DESCRIPTION OF THE INVENTION

In first and second embodiments, a universal joint is adapted to a propeller shaft of a motor vehicle.

First Embodiment

Figure 4:
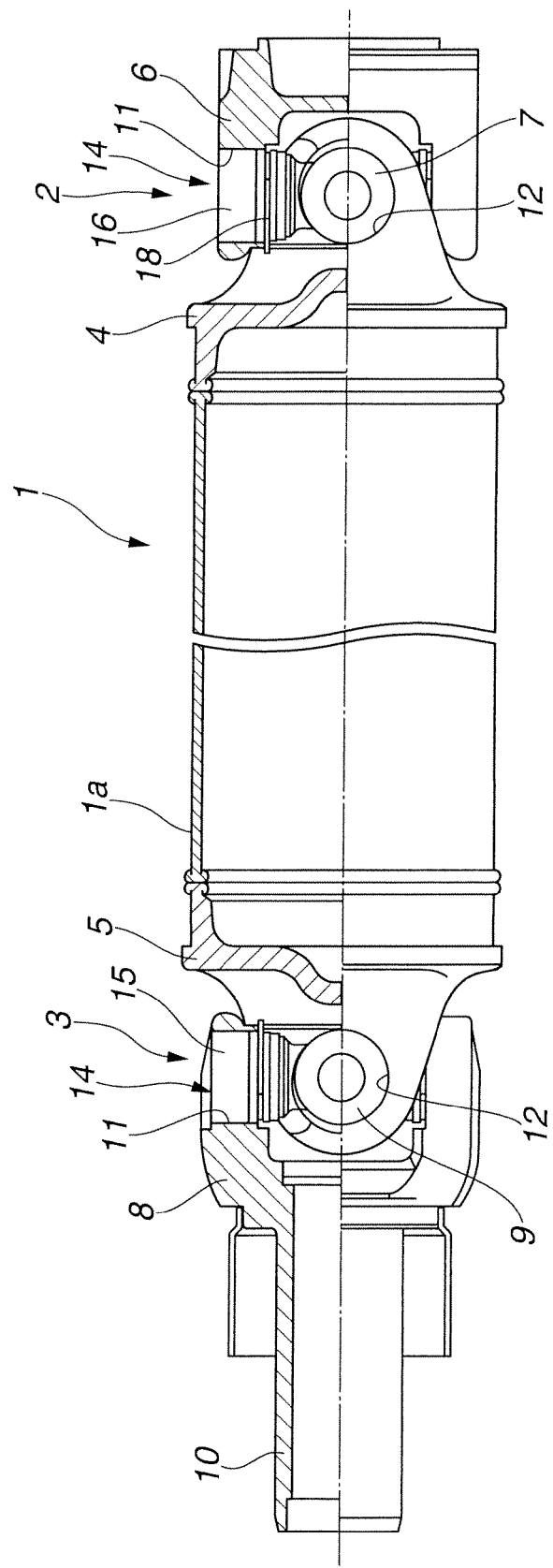
FIG. 4 is a cutout side view of a propeller shaft of a motor vehicle which is provided with the universal joint according to the first embodiment.

FIG. 4 shows a propeller shaft according to the first embodiment. The propeller shaft includes a drive shaft 1, a driven shaft not shown, a first universal joint 2, a second universal joint 3, and a center bearing not shown. Drive shaft 1 is linked to a transmission side. The driven shaft is liked with a differential gear side. First universal joint 2 is provided at one longitudinal end of drive shaft 1, whereas second universal joint 3 is provided at the other longitudinal end of drive shaft 1. The center bearing is disposed between drive shaft 1 and the driven shaft.

Drive shaft 1 includes a shaft body 1a which has a hollow-cylindrical shape and has a first longitudinal end to which a first ball yoke 4 is fixed by frictional pressure welding or the like and a second longitudinal end to which a second ball yoke 5 is fixed by frictional pressure welding, wherein first ball yoke 4 constitutes first universal joint 2 and second ball yoke 5 constitutes second universal joint 3.

First universal joint 2 includes a flange yoke 6 and a cross shaft member 7. Flange yoke 6 is disposed at a distal end portion of first ball yoke 4. Cross shaft member 7 is disposed between first ball yoke 4 and flange yoke 6.

Similarly, second universal joint 3 includes a sleeve yoke 8 and a cross shaft member 9. Sleeve yoke 8 is disposed at a distal end portion of second ball yoke 5. Cross shaft member 9 is disposed between second ball yoke 5 and sleeve yoke 8. A slip joint 10 is formed integrally with a front end portion of sleeve yoke 8.

The following describes specific configuration of first universal joint 2. Second universal joint 3 has the same basic structure as first universal joint 2. In the drawings, common reference characters are used to represent common components between first universal joint 2 and second universal joint 3.

Figure 5:
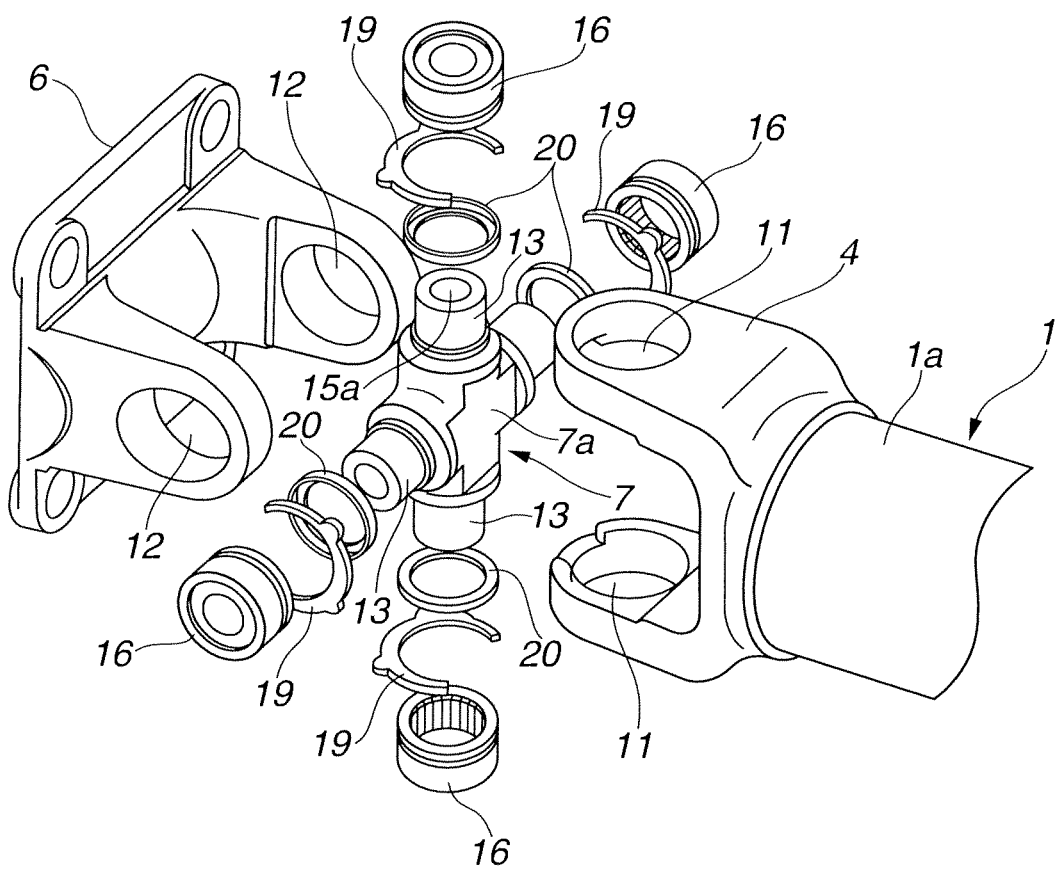
FIG. 5 is an exploded perspective view of the universal joint according to the first embodiment.

As shown in FIG. 5, each yoke 4, 6 of first universal joint 2 has a pair of branched projections. Each branched projection of first ball yoke 4 has a distal end portion where a yoke race hole 11 is formed to extend through the projection. Similarly, each branched projection of flange yoke 6 has a distal end portion where a yoke race hole 12 is formed to extend through the projection. Each of four shaft parts 13 of cross shaft member 7 is inserted in the corresponding yoke race hole 11, 12 via a bearing 14.

Figure 6:
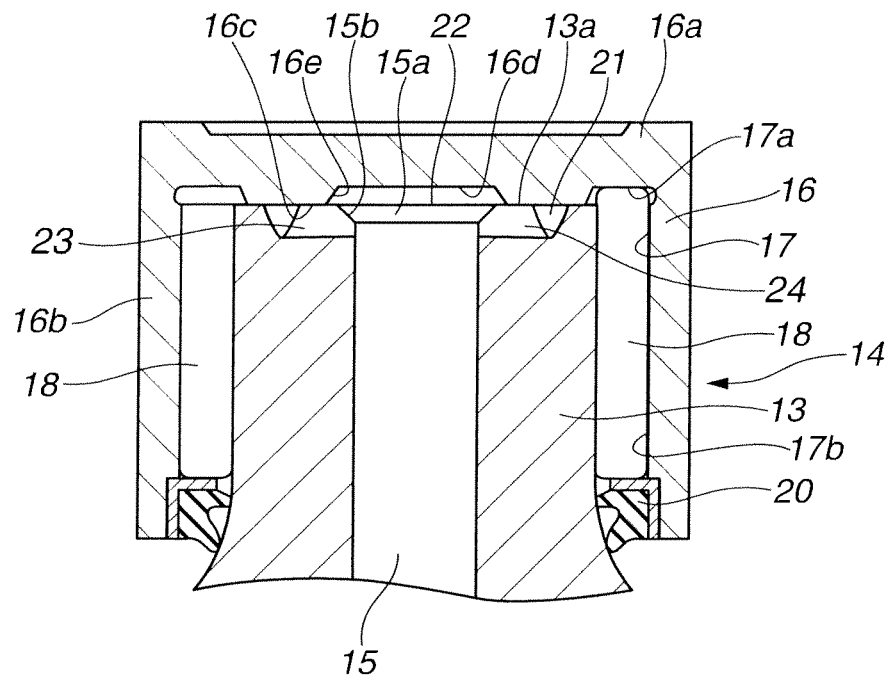
FIG. 6 is a partial longitudinal cross-sectional view of a universal joint according to a second embodiment of the present invention.

As shown in FIGS. 5 and 6, cross shaft member 7 includes a central part 7a, and four shaft parts 13 projecting from central part 7a, wherein four shaft parts 13 form a cross-shape. Each shaft part 13 is formed with an oil hole 15 inside which extends in the longitudinal direction of oil hole 15. Accordingly, four oil holes 15 form a cross-shape. Each oil hole 15 has a first end opening 15a at a distal end surface 13a of shaft part 13, wherein first end opening 15a has a first end opening edge 15b which is tapered and has a diameter which gradually increases as followed outwardly in the longitudinal direction of shaft part 13. Oil hole 15 is supplied and filled with lubricating oil such as grease.

Each shaft part 13 has a stepped shape having a larger diameter at the proximal end and a smaller diameter at the distal end. The distal end surface 13a of shaft part 13 is substantially flat.

Figure 1:
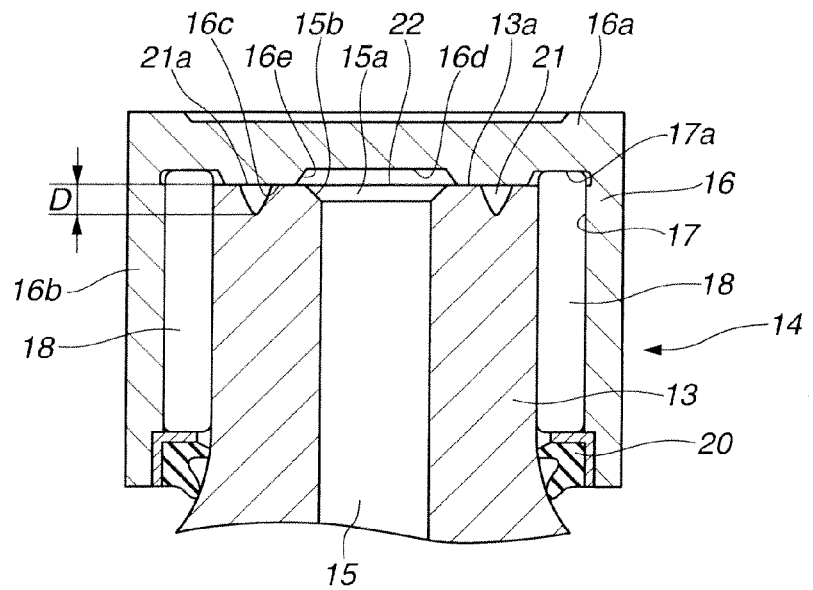
FIG. 1 is a partial longitudinal cross-sectional view of a universal joint according to a first embodiment of the present invention.

As shown in FIG. 1, each bearing 14 includes a bearing cup 16 and a plurality of cylindrical rollers 18. Bearing cup 16 is put closer toward shaft part 13 in the longitudinal direction of shaft part 13, and fitted over shaft part 13. Cylindrical rollers 18 are rotatably supported in a roller-retaining space 17 which is defined and surrounded by the inner peripheral surface of bearing cup 16, for rolling motion on the outer peripheral surface of shaft part 13.

As shown in FIGS. 1 and 4, each bearing cup 16 has a hollow cylindrical shape having a bottom. Specifically, bearing cup 16 has a bottom wall 16a and a cylindrical part 16b. Bottom wall 16a is located outside of shaft part 13 in the longitudinal direction of shaft part 13. Cylindrical part 16b is formed integrally with the peripheral edge of bottom wall 16a.

The bottom wall 16a of bearing cup 16 has an inner bottom surface 16c which is substantially flat. Inner bottom surface 16c is formed with a circular oil-receiving recess 16d at a central portion of inner bottom surface 16c. Accordingly, oil-receiving recess 16d is located to face the first end opening 15a of oil hole 15. Oil-receiving recess 16d has a relatively shallow depth and has an inner peripheral wall surface 16e that is tapered so that the diameter of inner peripheral wall surface 16e gradually increases as followed outwardly in the axial direction. Oil-receiving recess 16d has a slightly larger diameter than the first end opening 15a of oil hole 15.

Each bearing cup 16 is provided with a snap ring 19 that is fitted in a ring groove formed in the peripheral surface of an open side portion of bearing cup 16, and prevented by snap ring 19 from moving out of yoke race hole 11, 12 in the longitudinal direction of shaft part 13. An oil seal 20 is disposed in a clearance between the inner peripheral surface of cylindrical part 16b and the outer peripheral surface of shaft part 13 and is located closer to the open side of cylindrical part 16b, for preventing lubricating oil from flowing to the outside through the clearance after having flown from oil hole 15 to a space where cylindrical rollers 18 are disposed.

Cylindrical rollers 18 are retained by an annular roller-retaining space 17 which has a first end portion 17a closer to the bottom wall 16a of bearing cup 16 and a second end portion adjacent to oil seal 20, wherein the first end portion 17a is an annular recess formed in the peripheral portion of bottom wall 16a, as shown in FIG. 1.

Figure 2:
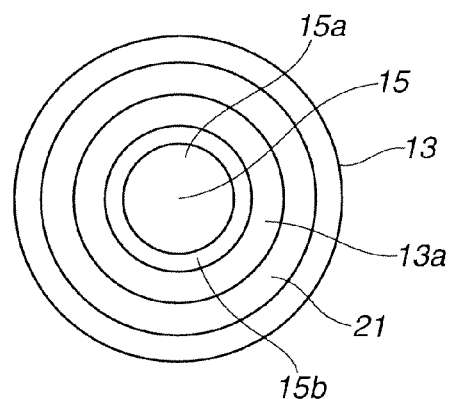
FIG. 2 is a plan view of a shaft part of a cross shaft member of the universal joint according to the first embodiment.
Figure 3:
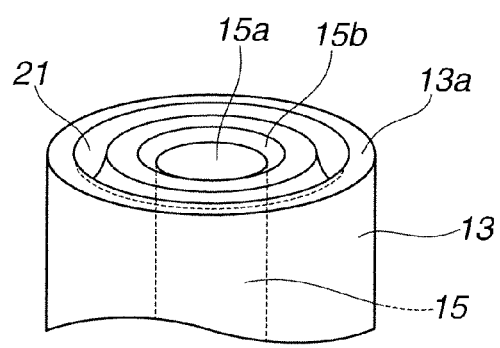
FIG. 3 is a partial perspective view of the shaft portion of FIG. 2.

As shown in FIGS. 1 to 3, each shaft part 13 is formed with an annular groove 21 in the distal end surface 13a for storing lubricating oil. Annular groove 21 is located in a substantially central region in the radial direction, encompassing the central axis of shaft part 13. Namely, annular groove 21 has a substantially medium diameter between the diameter of the inner peripheral surface of shaft part 13 and the outer peripheral surface of shaft part 13.

Annular groove 21 has a substantially V-shape cross section, specifically, an acute V-shape cross section, having an open end 21a facing the inner bottom surface 16c of bearing cup 16. The depth of annular groove 21, i.e. the distance between the bottom 21b and open end 21a of annular groove 21, which is represented by "D" in FIG. 1, and the total volumetric capacity of annular groove 21, are set so that annular groove 21 can constantly store a predetermined quantity of lubricating oil.

Operations and Effects

The configuration described above operates and produces advantageous effects as follows. When the propeller shaft rotates, the lubricating oil such as grease in oil hole 15 moves toward the inner bottom surface 16c of bearing cup 16 under centrifugal force, and flows into a disc-shaped space 22 defined between the first end opening 15a of oil hole 15 and the oil-receiving recess 16d of bearing cup 16, so that the lubricating oil is held and stored temporarily in the space 22.

Then, the lubricating oil flows from space 22 into a fine clearance between the distal end surface 13a of shaft part 13 and the inner bottom surface 16c of bearing cup 16, and travels radially outwardly, and flows into annular groove 21 through the open end 21a.

The lubricating oil flown into annular groove 21 is held and stored temporarily to lubricate the boundary or contact between the distal end surface 13a of shaft part 13 and the inner bottom surface 16c of bearing cup 16.

Namely, the lubricating oil flown into annular groove 21 is prevented at least temporarily from flowing immediately to the place where cylindrical rollers 18 are mounted, and thereby is stored first temporarily in annular groove 21. This serves to supply lubricating oil broadly and form an oil film effectively not only at a region of inner bottom surface 16c facing annular groove 21 but also at regions of the fine clearance around the annular groove 21.

Thereafter, that oil film is constantly maintained, whereas the lubricating oil flows into the first end portion 17a of roller-retaining space 17, and flows also into the second end portion of roller-retaining space 17 so that the cylindrical rollers 18 are lubricated with the supplied lubricating oil.

In this way, the configuration of this embodiment is capable of maintaining constantly a sufficient oil film at the fine clearance between the distal end surface 13a of shaft part 13 and the inner bottom surface 16c of bearing cup 16 wherein the oil film is formed from the lubricating oil temporarily held in annular groove 21, and thereby capable of preventing seizing therebetween effectively.

The further feature that the lubricating oil flown from the first end opening 15a of oil hole 15 to space 22 is also held in space 22 temporarily, and then flows toward annular groove 21, also serves to improve the lubrication between the distal end surface 13a of shaft part 13 and the inner bottom surface 16c of bearing cup 16. Namely, the feature that the lubricating oil does not immediately flow from oil hole 15 to annular groove 21 but is stopped temporarily in space 22 and flows out gradually in radial directions, serves to improve the lubrication between the distal end surface 13a of shaft part 13 and the inner bottom surface 16c of bearing cup 16.

The further feature that the lubricating oil flown from oil hole 15 into space 22 between the first end opening 15a of oil hole 15 and the oil-receiving recess 16d of bearing cup 16 easily flows into the fine clearance between the distal end surface 13a of shaft part 13 and the inner bottom surface 16c of bearing cup 16 through the path defined between the tapered wall 15b of first end opening 15a of oil hole 15 and the tapered inner wall 16e of oil-receiving recess 16d of bearing cup, serves to further enhance the condition of lubrication.

Second Embodiment

Figure 7:
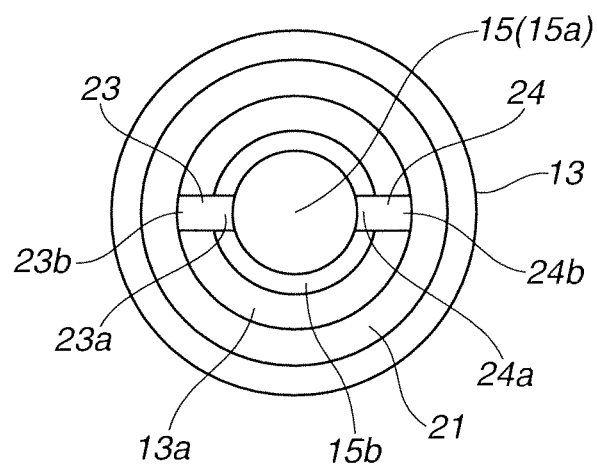
FIG. 7 is a plan view of a shaft part of a cross shaft member of the universal joint according to the second embodiment.

FIGS. 6 and 7 show a universal joint according to a second embodiment of the present invention. The second embodiment is based on the first embodiment, and modified so that the distal end surface 13a of shaft part 13 is formed with a pair of communication passages 23, 24 which allow fluid communication between the first end opening 15a of oil hole 15 and annular groove 21.

Each communication passage 23, 24 extends in a radial direction from the first end opening 15a of oil hole 15, and has a substantially V-shape cross section similar to annular groove 21. The depth and width of communication passage 23, 24 is set substantially equal to that of annular groove 21. Communication passage 23, 24 has a first end portion 23a, 24a connected to the first end opening edge 15b of first end opening 15a of oil hole 15, and a second end portion 23b, 24b connected to the inner periphery of annular groove 21.

In the configuration described above, the lubricating oil flown from oil hole 15 to space 22 is supplied relatively quickly to annular groove 21 through communication passages 23, 24, and held temporarily in annular groove 21. The lubricating oil in annular groove 21 flows outwardly in radial directions into the fine clearance between the distal end surface 13a of shaft part 13 and the inner bottom surface 16c of bearing cup 16, and thereby easily forms an oil film and achieves preferable lubrication therebetween, as in the first embodiment.

Especially, the provision of communication passages 23, 24 serves to relatively quickly supply lubricating oil into annular groove 21 and the places around annular groove 21 which are generally likely to undergo seizing, and thereby improve the condition of lubrication and further prevent seizing between contact surfaces.

Moreover, the lubricating oil flown into space 22 and communication passages 23, 24 is supplied into the fine clearance between distal end surface 13a of shaft part 13 and the inner bottom surface 16c of bearing cup 16 without passing through the annular groove 21, serves to enhance the overall lubrication condition.

When the lubricating oil flown into communication passages 23, 24 is supplied to annular groove 21 so that annular groove 21 is filled with lubricating oil, the feature that annular groove 21 can be regarded as forming a closed circuit serves to make communication passages 23, 24 also filled with lubricating oil. Namely, communication passages 23, 24 also serve to hold lubricating oil, as well as annular groove 21. Accordingly, the fine clearance between the distal end surface 13a of shaft part 13 and the inner bottom surface 16c of bearing cup 16 is constantly supplied with lubricating oil from annular groove 21 and communication passages 23, 24. This feature serves to significantly enhance the lubrication condition, and prevent the seizing more effectively.

The configurations according to the first and second embodiments may be modified. For example, each combination of shaft part 13 and bearing cup 16 of the universal joint may be provided with a plurality of annular grooves 21. Annular groove 21 may be formed not in the distal end surface 13a of shaft part 13 but in the inner bottom surface 16c of bearing cup 16 or both in the distal end surface 13a of shaft part 13 and the inner bottom surface 16c of bearing cup 16. Each combination of shaft part 13 and bearing cup 16 of the universal joint may be provided with three or more communication passages 23, 24 extending in radial directions from first end opening 15a of oil hole 15 to annular groove 21.

The universal joint according to the first and second embodiments may be applied to another propeller shaft of a ship or the like other than motor vehicles.

The entire contents of Japanese Patent Application 2011-186718 filed Aug. 30, 2011 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A universal joint comprising:
   a cross shaft member including first, second, third and fourth shaft parts forming a cross-shape; and
   first, second, third and fourth bearing cups corresponding respectively to the first, second, third and fourth shaft parts,
   wherein each bearing cup has a hollow-cylindrical shape having a bottom and is rotatably mounted to the corresponding shaft part through a roller disposed between an inner peripheral surface of the each bearing cup and an outer peripheral surface of the corresponding shaft part,
   wherein each bearing cup includes an inner bottom surface in sliding contact with a distal end surface of the corresponding shaft part,
   wherein the sliding contact is in an annular region encompassing a central axis of the corresponding shaft part;
   wherein the distal end surface of the first shaft part is formed with at least one annular groove encompassing the central axis of the first shaft part for storing oil,
   wherein the at least one annular groove is located within the annular region,
   wherein each shaft part is formed with an oil hole inside thereof,
   wherein the oil hole has an opening at the distal end surface of each shaft part, and each bearing cup has a recess at the inner bottom surface, and
   wherein the recess faces the oil hole of the corresponding shaft part and defines a space configured to hold oil.

2. The universal joint as claimed in claim 1, wherein the distal end surface of each of the second, third and fourth shaft parts is formed with at least one annular groove encompassing the central axis of the each of the second, third and fourth shaft parts for storing oil.

3. The universal joint as claimed in claim 1, wherein the annular groove has a V-shape cross-section.

4. The universal joint as claimed in claim 1, wherein at least one of the distal end surface of the first shaft part and the inner bottom surface of the first bearing cup is formed with a communication passage allowing fluid communication between the annular groove and the oil hole formed inside of the first shaft part.

5. The universal joint as claimed in claim 4, wherein the communication passage extends from the oil hole radially of the first shaft part.

6. The universal joint as claimed in claim 1, wherein the space has a larger size radially of the corresponding shaft part than the oil hole.

7. A universal joint comprising:
   a cross shaft member including first, second, third and fourth shaft parts forming a cross-shape; and
   first, second, third and fourth bearing cups corresponding respectively to the first, second, third and fourth shaft parts,
   wherein each bearing cup has a hollow-cylindrical shape having a bottom and is rotatably mounted to the corresponding shaft part through a roller disposed between an inner peripheral surface of the each bearing cup and an outer peripheral surface of the corresponding shaft part,
   wherein each bearing cup includes an inner bottom surface in sliding contact with a distal end surface of the corresponding shaft part,
   wherein the sliding contact is through lubricating oil and in an annular region encompassing a central axis of the corresponding shaft part;

wherein the distal end surface of the first shaft part is formed with at least one annular groove encompassing the central axis of the first shaft part for holding the lubricating oil, wherein the at least one annular groove is located within the annular region, wherein each shaft part is formed with an oil hole inside thereof, wherein the oil hole has an opening at the distal end surface of each shaft part, wherein each bearing cup has a recess at the inner bottom surface, and wherein the recess faces the oil hole of the corresponding shaft part and defines a space configured to hold the lubricating oil.

8. The universal joint as claimed in claim 7, wherein the distal end surface of the each shaft part is formed with a communication passage allowing fluid communication between the annular groove of the each shaft part and the oil hole formed inside of the each shaft part.

9. The universal joint as claimed in claim 8, wherein the communication passage extends from the oil hole radially of the each shaft part.

10. The universal joint as claimed in claim 7, wherein the space allows the lubricating oil to flow from the oil hole to the annular groove.

11. The universal joint as claimed in claim 10, wherein the lubricating oil stored in the annular groove forms an oil film between the distal end surface of the each shaft part and the inner bottom surface of the corresponding bearing cup.

12. A propeller shaft comprising:
a ball yoke fixed to a longitudinal end portion of a hollow shaft body, the ball yoke comprising a universal joint;
a cross shaft member including first, second, third and fourth shaft parts forming a cross-shape,
wherein the first shaft part is arranged in a race hole formed in the ball yoke; and
first, second, third and fourth bearing cups corresponding respectively to the first, second, third and fourth shaft parts,
wherein each bearing cup has a hollow-cylindrical shape having a bottom and is rotatably mounted to the corresponding shaft part through a roller disposed between an inner peripheral surface of the each bearing cup and an outer peripheral surface of the corresponding shaft part,
wherein each bearing cup includes an inner bottom surface in sliding contact with a distal end surface of the corresponding shaft part,
wherein the sliding contact is in an annular region encompassing a central axis of the corresponding shaft part;
wherein at least one of the distal end surface of the first shaft part and the inner bottom surface of the first bearing cup is formed with at least one annular groove encompassing the central axis of the first shaft part for storing oil,
wherein the at least one annular groove is located within the annular region,
wherein each shaft part is formed with an oil hole inside thereof,
wherein the oil hole has an opening at the distal end surface of the each shaft part, and each bearing cup has a recess at the inner bottom surface,
wherein the recess faces the oil hole of the corresponding shaft part and defines a space for holding oil, and
wherein the distal end surface of each of the second, third and fourth shaft parts is formed with at least one annular groove encompassing the central axis of the each of the second, third and fourth shaft parts for storing oil.

13. The propeller shaft as claimed in claim 12, wherein the distal end surface of the first shaft part is formed with the annular groove.

14. The propeller shaft as claimed in claim 12, wherein at least one of the distal end surface of the first shaft part and the inner bottom surface of the first bearing cup is formed with a communication passage allowing fluid communication between the annular groove and the oil hole formed inside of the first shaft part.

15. The propeller shaft as claimed in claim 14, wherein the distal end surface of the first shaft part is formed with the annular groove and the communication passage.

* * * * *